US011847353B2

(12) United States Patent
Parry et al.

(10) Patent No.: US 11,847,353 B2
(45) Date of Patent: Dec. 19, 2023

(54) SUSPEND OPERATION WITH DATA TRANSFER TO HOST SYSTEM

(71) Applicant: Micron Technology, Inc., Boise, ID (US)

(72) Inventors: Jonathan S. Parry, Boise, ID (US); Christian M. Gyllenskog, Meridian, ID (US); Luca Porzio, Casalnuovo (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/649,268

(22) Filed: Jan. 28, 2022

(65) Prior Publication Data

US 2023/0060200 A1 Mar. 2, 2023

Related U.S. Application Data

(60) Provisional application No. 63/238,008, filed on Aug. 27, 2021.

(51) Int. Cl.
*G06F 3/06* (2006.01)
(52) U.S. Cl.
CPC .......... *G06F 3/0659* (2013.01); *G06F 3/0619* (2013.01); *G06F 3/0625* (2013.01); *G06F 3/0634* (2013.01); *G06F 3/0679* (2013.01)

(58) Field of Classification Search
CPC .... G06F 3/0659; G06F 3/0619; G06F 3/0625; G06F 3/0634; G06F 3/0679
See application file for complete search history.

(56) References Cited

U.S. PATENT DOCUMENTS

2013/0166819 A1* 6/2013 Yerushalmi ........... G06F 3/0634
711/E12.008
2017/0003981 A1* 1/2017 Erez ....................... G06F 3/0685

\* cited by examiner

*Primary Examiner* — Edward J Dudek, Jr.
(74) *Attorney, Agent, or Firm* — Holland & Hart LLP

(57) ABSTRACT

Methods, systems, and devices for suspend operation with data transfer to a host system are described. A host system may transmit a read command to a memory system operating in a first mode of operation (e.g., a standard mode associated with a nominal power consumption) indicating for the memory system to transition to a second mode of operation (e.g., a suspend mode associated with a decreased power consumption). Here, the memory system may transmit an image of the memory system stored in volatile memory to the host system and transition the memory system to the second mode. Additionally, the host system may transmit, to the memory system operating in the second mode, a write command including the image and indicating for the memory system to transition to the first mode. Here, the memory system may write the image to the volatile memory and transition to the first mode.

23 Claims, 6 Drawing Sheets

SUSPEND OPERATION WITH DATA TRANSFER TO HOST SYSTEM

CROSS REFERENCE

The present Application for Patent claims the benefit of U.S. Provisional Patent Application No. 63/238,008 by PARRY et al., entitled "SUSPEND OPERATION WITH DATA TRANSFER TO HOST SYSTEM," filed Aug. 27, 2021, assigned to the assignee hereof, and expressly incorporated by reference in its entirety herein.

FIELD OF TECHNOLOGY

The following relates generally to one or more systems for memory and more specifically to suspend operation with data transfer to a host system.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
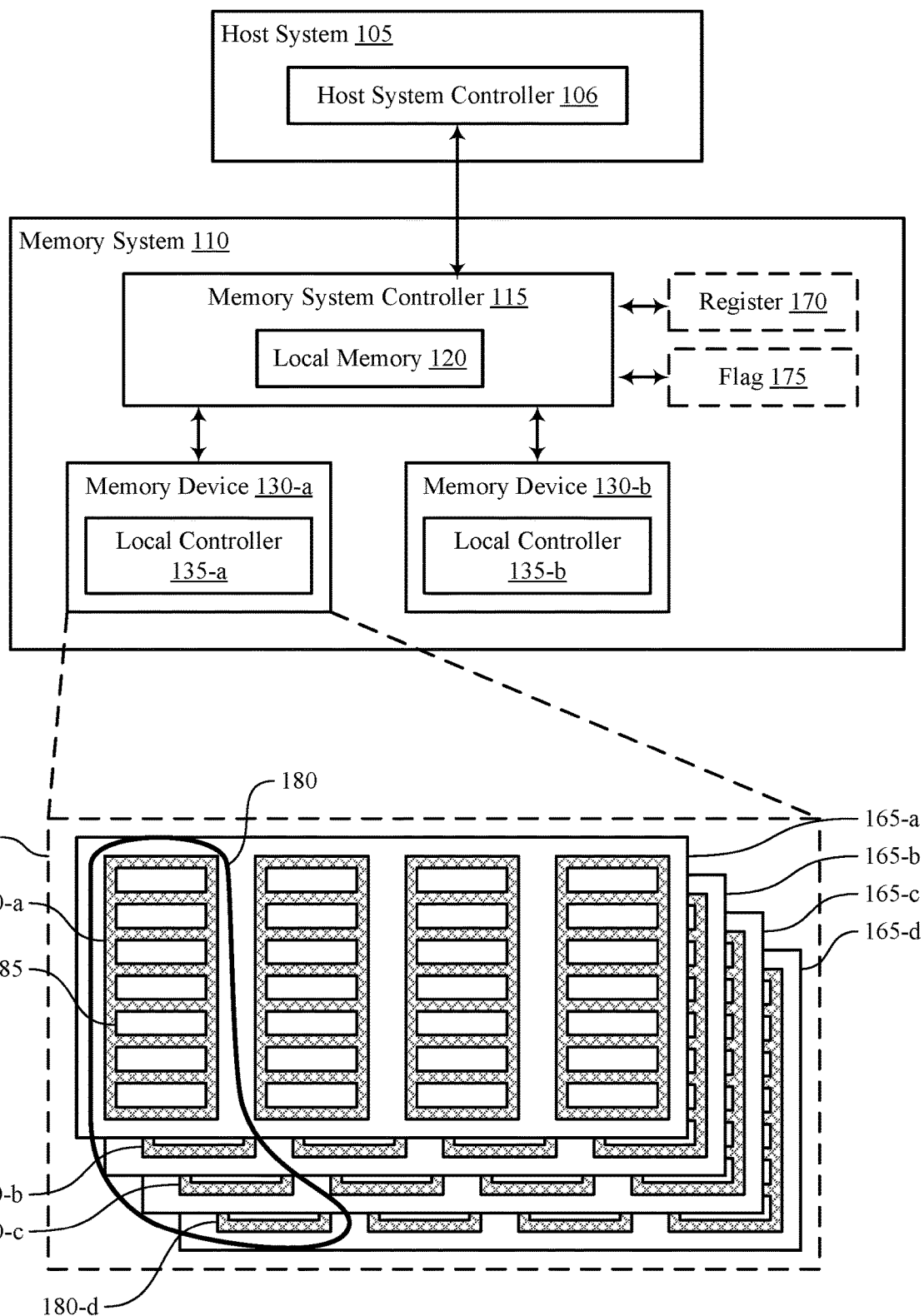
FIG. 1 illustrates an example of a system that supports suspend operation with data transfer to a host system in accordance with examples as disclosed herein.

A memory system may operate according to more than one mode of operation. For example, the memory system may operate in a first mode of operation associated with a first power consumption (e.g., a nominal power consumption) and may, alternatively, operate in a second mode of operation associated with a second, decreased power consumption. In some examples, the first mode of operation may correspond to a standard operating mode and the second mode of operation may correspond to a lower-power mode compared to the standard operating mode (e.g., a suspend mode, a sleep mode, a hibernation mode). If operating in the first mode, the memory system may supply power to both volatile and non-volatile memory devices within the memory system. To decrease the power consumption of the memory system if operating in the second mode, the memory system may decrease an amount of power supplied to the one or more volatile memory devices within the memory system (e.g., in comparison to the amount of power supplied to the one or more volatile memory devices in the first mode of operation), which may cause the one or more volatile memory devices to not retain data.

To avoid losing data stored in the one or more volatile memory devices if the memory system operates according to the second mode (e.g., the low-power mode), the memory system may write an image of the memory system stored in the volatile memory (e.g., in at least one of the one or more volatile memory devices) to one or more non-volatile memory devices prior to transitioning the memory system from the first mode to the second, lower-power mode. Thus, if the memory system transitions back to the first mode of operation (e.g., and increases an amount of power supplied to the volatile memory), the memory system may write the image from the non-volatile memory back to the volatile memory, thus preventing a loss of data due to operating the memory system in the lower-power mode. In some instances, however, the process of writing the image of the memory system stored in the volatile memory to non-volatile memory and writing the data back from the non-volatile memory to the volatile memory device may decrease a performance of the memory system. That is, storing the image in non-volatile memory may temporarily increase a power consumption on the memory system (e.g., due to draining current to save the data in the volatile memory). Additionally, performing access operations on the volatile memory (e.g., to write the image to the non-volatile memory, to read the image from the non-volatile memory) may decrease a reliability of the non-volatile memory over time. Further, writing and reading the image to and from the non-volatile memory may introduce latency to the memory system.

In some cases, the memory system may additionally or alternatively transmit the image (or some indication of the image) to the host system (e.g., to avoid or decrease a size of the image written to the non-volatile memory) prior to operating the memory system in the second, lower-power mode. For example, the host system may transmit a read command that indicates for the memory system to transmit the image of the memory system stored in the volatile memory and indicates for the memory system to operate in the lower-power mode. In response to receiving the read command, the memory system may transmit the image of the memory system (or some indication about one or more aspects of the image of the memory system) to the host system and may transition from operating the memory system in the first mode to operating the memory system in the second, lower-power mode. If the memory system is operating in the second, lower-power mode, the host system may transmit a write command that includes the image of the memory system stored in the volatile memory and indicates for the memory system to operate in the first mode (e.g., corresponding to the nominal power consumption). In response to receiving the write command, the memory system may write the image to the volatile memory and transition from operating the memory system in the second, lower-power mode to operating in the second, nominal-power mode. Thus, the memory system may retain data stored in the volatile memory while operating in the lower-power mode without relying on writing the image to and from the volatile memory. In some instances this may, among other advantages, reduce latency associated with the memory system, decrease power consumption at the memory system if transitioning between the first and second modes of operation, and improve a reliability of the non-volatile memory over time.

Figure 2:
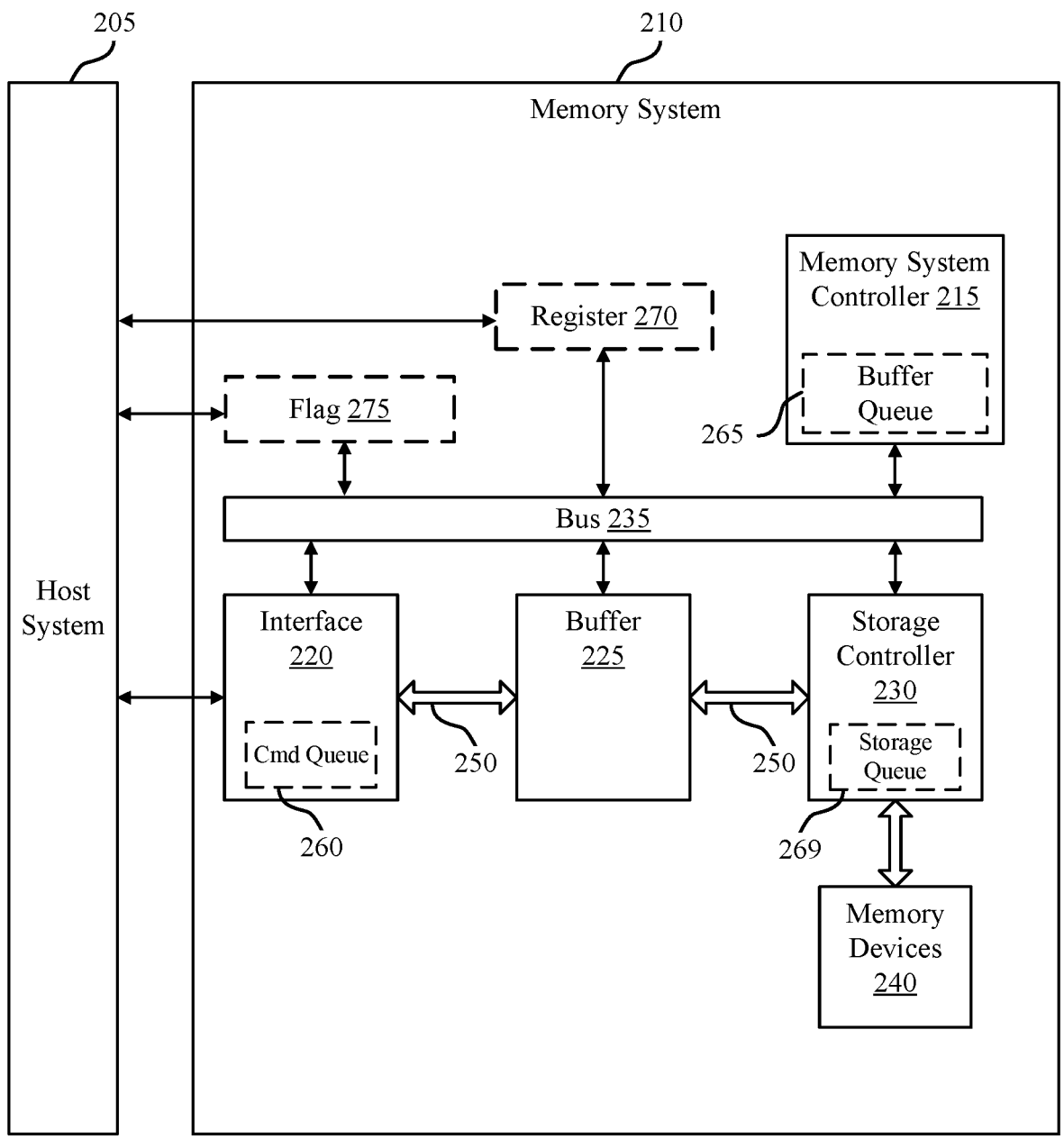
FIG. 2 illustrates an example of a system that supports suspend operation with data transfer to a host system in accordance with examples as disclosed herein.
Figure 3:
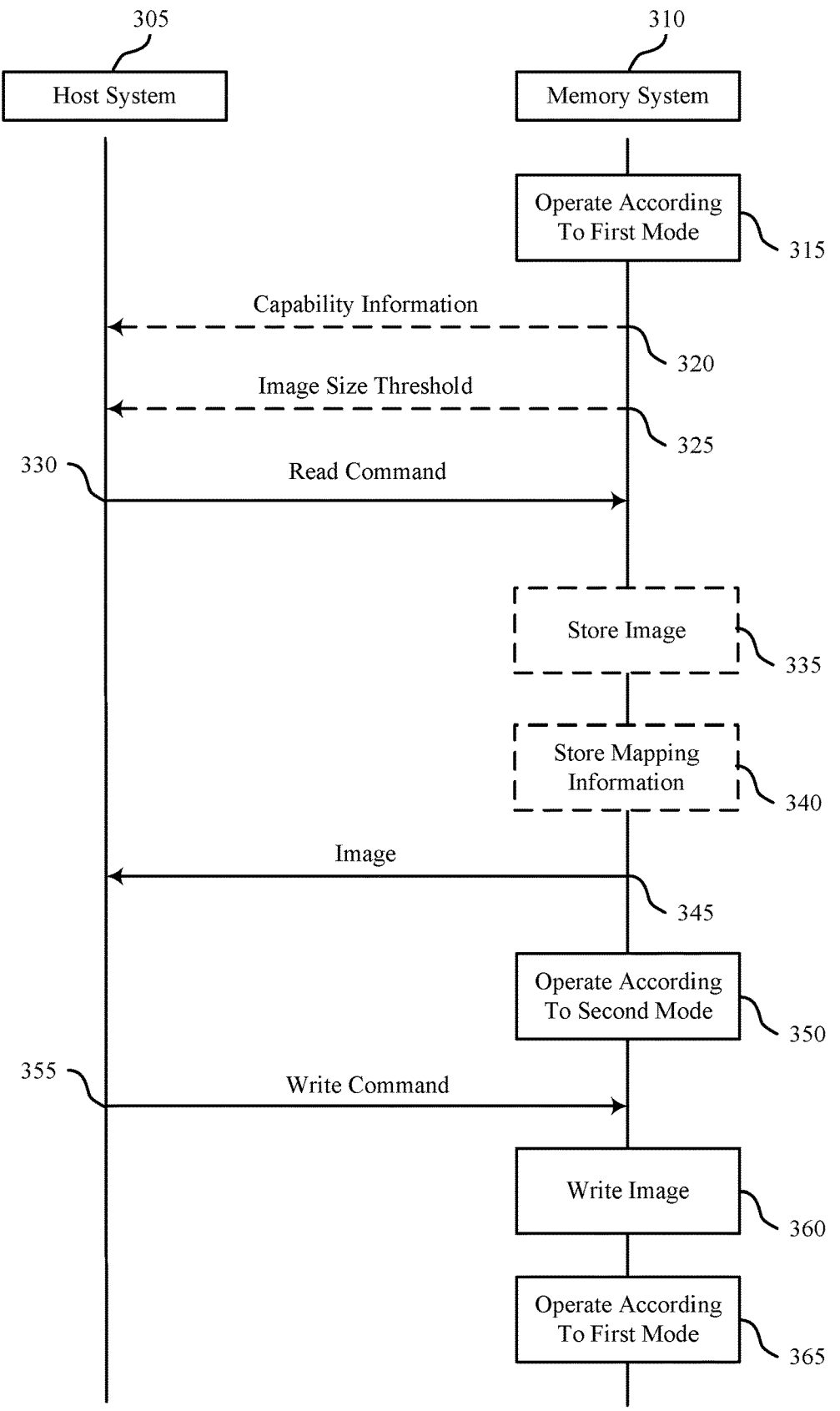
FIG. 3 illustrates an example of a process flow that supports suspend operation with data transfer to a host system in accordance with examples as disclosed herein.

Features of the disclosure are initially described in the context of systems and process flows with reference to FIGS. 1 through 3. These and other features of the disclosure are further illustrated by and described in the context of an apparatus diagram and flowchart that relate to suspend operation with data transfer to a host system with reference to FIGS. 4-6.

FIG. 1 illustrates an example of a system 100 that supports suspend operation with data transfer to a host system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). For example, memory device 130-a may be or include volatile memory (e.g., may include volatile memory cells) and memory device 130-b may be or include non-volatile memory (e.g., may include non-volatile memory cells). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include volatile memory such as static random access memory (SRAM) or other memory that may be used by the memory system controller 115 for internal storage or calculations, for example, related to the functions ascribed herein to the memory system controller 115. Additionally or alternatively, the local memory 120 may include volatile memory to serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 180, where each block 180 may include a respective set of pages 185, and each page 185 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 180, and in some cases, concurrent operations may take place within different planes 165. For example, concurrent operations may be performed on memory cells within different blocks 180 so long as the different blocks 180 are in different planes 165. In some cases, an individual block 180 may be referred to as a physical block, and a virtual block 180 may refer to a group of blocks 180 within which concurrent operations may occur. For example, concurrent operations may be performed on blocks 180-a, 180-b, 180-c, and 180-d that are within planes 165-a, 165-b, 165c, and 165-d, respectively, and blocks 180-a, 180-b, 180-c, and 180-d may be collectively referred to as a virtual block 180. In some cases, a virtual block may include blocks 180 from different memory devices 130 (e.g., including blocks in one or more planes of memory device 130-a and memory device 130-b). In some cases, the blocks 180 within a virtual block may have the same block address within their respective planes 165 (e.g., block 180-a may be "block 0" of plane 165-a, block 180-b may be "block 0" of plane 165-b, and so on). In some cases, performing concurrent operations in different planes 165 may be subject to one or more restrictions, such as concurrent operations being performed on memory cells within different pages 185 that have the same page address within their respective planes 165 (e.g., related to command decoding, page address decoding circuitry, or other circuitry being shared across planes 165).

In some cases, a block 180 may include memory cells organized into rows (pages 185) and columns (e.g., strings, not shown). For example, memory cells in a same page 185 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 185 may be the smallest unit of memory (e.g., set of memory cells) that may be independently programmed or read (e.g., programed or read concurrently as part of a single program or read operation), and a block 180 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 185 may in some cases not be updated until the entire block 180 that includes the page 185 has been erased.

The system 100 may include any quantity of non-transitory computer readable media that support suspend operation with data transfer to a host system. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system 110 that may include, for example, one or more memory arrays and related circuitry combined with a local (e.g., on-die or in-package) controller (e.g., local controller 135). An example of a managed memory system 110 is a managed NAND (MNAND) system.

The memory system 110 may operate according more than one mode, each mode associated with different levels of power consumption. For example, the memory system 110 may operate in a first mode of operation associated with a first power consumption (e.g., a nominal power consumption) and may, alternatively, operate in a second mode of operation associated with a second, decreased power consumption. Here, the first mode of operation may correspond to a standard operating mode and the second mode of operation may correspond to a lower-power mode compared to the standard operating mode (e.g., a suspend mode, a sleep mode, a hibernation mode). If operating in the first mode, the memory system 110 may supply power to both volatile memory devices 130 (e.g., memory device 130-a, local memory 120) and non-volatile memory device 130 (e.g., memory device 130-b) within the memory system 110. To decrease the power consumption of the memory system 110 if operating in the second mode, the memory system 110 may decrease an amount of power supplied to the volatile memory devices 130 (e.g., memory device 130-a, local memory 120) within the memory system 110 (e.g., in comparison to the amount of power supplied to the volatile memory devices 130-a and local memory 120 in the first mode of operation), which may cause the volatile memory devices 130-a and the local memory 120 to not retain data.

To avoid losing data stored in a volatile memory device 130-a if the memory system 110 operates according to the second mode (e.g., the low-power mode), the memory system 110 may write an image of the memory system 110 stored in the volatile memory device 130-a (e.g., and, in some cases, other volatile memory in the memory system 110 such as local memory 120 in cases that the local memory 120 includes volatile memory such as a cache) to non-volatile memory device 130-b prior to transitioning the memory system 110 from the first mode to the second, lower-power mode. The image may include data stored in the volatile memory device 130-a (e.g., a state of the NAND memory device 130-a), data associated with the local controller 135-a of the volatile memory device 130-a (e.g., a state of the NAND local controller 135-a), data stored in other volatile memory of the memory system 110 (e.g., data stored in the SRAM or cache of the local memory 120), data associated with firmware tables of the memory system 110, configuration details associated with the memory system 110, or a combination thereof.

If the memory system 110 transitions back to the first mode of operation (e.g., and increases an amount of power supplied to the volatile memory device 130-a), the memory system 110 may write the image from the non-volatile memory device 130-b back to the volatile memory device 130-a, thus preventing a loss of data due to operating the memory system 110 in the lower-power mode. In some instances, the process of writing the image of the memory system 110 stored in the volatile memory device 130-a to non-volatile memory device 130-b and writing the data back from the non-volatile memory device 130-b to the volatile memory device 130-a device may decrease a performance of the memory system 110. That is, storing the image in non-volatile memory device 130-b may temporarily increase a power consumption on the memory system 110 (e.g., due to draining current to save the data in the volatile memory device 130-a). Additionally, performing access operations on the volatile memory device 130-a (e.g., to write the image to the non-volatile memory device 130-b, to read the image from the non-volatile memory device 130-b) may decrease a reliability of the non-volatile memory device 130-b over time. Further, writing and reading the image to and from the non-volatile memory device 130-b may introduce latency to the memory system 110.

Additionally or alternatively, the memory system 110 may transmit the image to the host system 105 (e.g., to avoid or decrease a size of the image written to the non-volatile memory device 130-b, to decrease a latency associated with switching between operating modes) prior to operating the memory system 110 in the second or lower-power mode. In one case, the memory system 110 may transmit the image to the host system 105 and refrain from writing the image to the non-volatile memory device 130-b. In some other cases, the memory system 110 may transmit the image to the host system 105 in addition to writing the image to the non-volatile memory device 130-b.

The memory system 110 may transmit the image of the memory system 110 stored in volatile memory in response to a request received from the host system 105 to transition the memory system 110 to a lower-power mode. For example, the host system 105 may transmit a read command that indicates for the memory system 110 to transmit the image of the memory system 110 stored in the volatile memory device 130-a and indicates for the memory system 110 to operate in the lower-power mode. That is, the host system 105 may transmit a start stop unit with memory (SSUM) read command indicating for the memory system 110 to decrease a power consumption of the memory system 110 (e.g., indicating for the memory system 110 to enter a power down or sleep mode). In response to receiving the read command (e.g., the SSUM read command), the memory system 110 may transmit the image of the memory system 110 to the host system 105. The image of the memory system 110 stored in volatile memory may include data stored in the volatile memory device 130-a (e.g., a state of the NAND memory device 130-a), data associated with the local controller 135-a of the volatile memory device 130-a (e.g., a state of the NAND local controller 135-a), data stored in other volatile memory of the memory system 110 (e.g., data stored in the SRAM or cache of the local memory 120), data associated with firmware tables of the memory system 110, configuration details associated with the memory system 110, or a combination thereof.

Additionally, the memory system 110 may transition from operating the memory system 110 in the first mode to operating the memory system 110 in the second, lower-power mode in response to receiving the read command (e.g., the SSUM read command). For example, the memory system 110 may decrease an amount of power supplied to one or more volatile memory devices 130 (e.g., volatile memory device 130-a, one or more caches in the memory system 110, SRAM at the memory system).

If the memory system 110 is operating in the second, lower-power mode, the host system 105 may transmit a write command that includes the image of the memory system 110 stored in the volatile memory device 130-a and indicates for the memory system 110 to operate in the first mode (e.g., corresponding to the nominal power consumption). That is, the host system 105 may transmit an SSUM write command indicating for the memory system 110 to increase a power consumption (e.g., an amount of power supplied to volatile memory in the memory system 110, an indication for the memory system 110 to exit a lower-power mode such as a sleep or hibernation mode). In response to receiving the write command, the memory system 110 may write the image to the volatile memory device 130-a and transition from operating the memory system 110 in the second, lower-power mode to operating in the second, nominal-power mode. For example, the memory system 110 may increase an amount of power supplied to the volatile memory device 130-a, and any other volatile memory devices 130 or volatile memory such as a cache or SRAM in the memory system 110 in response to receiving the write command (e.g., the SSUM write command) from the host system 105.

Thus, the memory system 110 may retain data stored in the volatile memory device 130-a while operating in the lower-power mode without relying on writing the image to and from the volatile memory device 130-a. In some instances this may reduce latency associated with the memory system 110, decrease power consumption at the memory system 110 if transitioning between the first and second modes of operation, and improve a reliability of the non-volatile memory device 130-b over time.

In some instances, the memory system 110 may indicate, to the host system 105 a capability of the memory system 110 to enter and exit lower-power modes of operation in response to read and write commands (e.g., SSUM read and SSUM write commands). Here, the host system 105 may transmit the SSUM read and SSUM write commands in response to the memory system 110 indicating the capability (e.g., as opposed to transmitting other commands to transition the memory system 110 between modes of operation not associated with the transmission of the image between the memory system 110 and the host system 105).

In one example, the memory system 110 may indicate the capability of the memory system 110 via a register 170 at the memory system 110. Here, the memory system 110 may set a register 170 associated with this capability information (e.g., an SSUM_Capability register 170) to a value indicating that the memory system 110 is capable of entering and exiting lower-power modes in response to the read and write commands and the host system 105 may identify the capability of the memory system 110 by polling or reading the register 170. In another example, the memory system 110 may indicate the capability of the memory system 110 via a flag 175. Here, the memory system 110 may set the flag 175 to indicate the capability of the memory system 110 to execute the SSUM read and write commands and the host system 105 may poll the memory system 110 (e.g., a storage location of the memory system 110, a register 170 of the memory system 110) that may include flag to determine the capability of the memory system 110. In another example, the memory system 110 may indicate the capability of the memory system 110 by transmitting signaling to the host system 105 indicating the capability of the memory system 110 to enter and exit lower-power modes in response to the read and write commands (e.g., the SSUM read and SSUM write commands).

The memory system 110 may indicate, to the host system 105, a threshold size of the image of the memory system 110 transmitted between the host system 105 and the memory system 110 during an execution of the read and write commands (e.g., the SSUM read and write commands). For example, the memory system 110 may indicate a maximum size of the image transmitted to the host system 105 in response to the read command. The threshold size indicated by the memory system 110 may be a multiple of a data size (e.g., may have a granularity) of data exchanged between the host system 105 and the memory system 110 (e.g., 4 kilobytes). In some cases, the host system 105 may indicate a size for the image in the read command (e.g., in the SSUM read command). If the memory system 110 indicates the threshold size of the image to the host system 105, the indicated size of the image in the read command may be less than or equal to the threshold size indicated by the memory system 110.

In one example, the memory system 110 may indicate the threshold size via a register 170 at the memory system 110. Here, the memory system 110 may set a register 170 associated with this threshold size information to a value indicating the threshold size and the host system 105 may identify the threshold size by polling or reading the register 170. In another example, the memory system 110 may indicate the threshold size by transmitting signaling to the host system 105 indicating the threshold size.

FIG. 2 illustrates an example of a system 200 that supports suspend operation with data transfer to a host system in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 269) may be used to control the processing of the access commands and the movement of the corresponding data. This may be beneficial, e.g., if more than one access command from the host system 205 is processed concurrently by the memory system 210. The command queue 260, buffer queue 265, and storage queue 269 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine that the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine whether the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 269 may be used to aid with the transfer of write data. For example, the memory system controller 215 may push (e.g., via the bus 235) write commands from the buffer queue 265 to the storage queue 269 for processing. The storage queue 269 may include entries for each access command. In some examples, the storage queue 269 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 269 the location within the buffer 225 from which to obtain the data. The storage controller 230 may manage the locations within the memory devices 240 to store the data (e.g., performing wear-leveling, garbage collection, and the like). The entries may be added to the storage queue 269, e.g., by the memory system controller 215. The entries may be removed from the storage queue 269, e.g., by the storage controller 230 or memory system controller 215 upon completion of the transfer of the data.

To process a read command received from the host system 205, the memory system controller 215 may again first determine whether the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 269 may be used to aid with the transfer of read data. For example, the memory system controller 215 may push the read command to the storage queue 269 for processing. In some cases, the storage controller 230 may obtain from the buffer 225 or storage queue 269 the location within the memory devices 240 from which to retrieve the data. In some cases, the storage controller 230 may obtain from the buffer queue 265 the location within the buffer 225 to store the data. In some cases, the storage controller 230 may obtain from the storage queue 269 the location within the buffer 225 to store the data. In some cases, the memory system controller 215 may move the command processed by the storage queue 269 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

The memory system 210 may operate according more than one mode, each associated with different levels of power consumption. For example, the memory system 210 may operate in a first mode of operation associated with a first power consumption (e.g., a nominal power consumption) and may, alternatively, operate in a second mode of operation associated with a second, decreased power consumption. Here, the first mode of operation may correspond to a standard operating mode and the second mode of operation may correspond to a lower-power mode compared to the standard operating mode (e.g., a suspend mode, a sleep mode, a hibernation mode). If operating in the first mode, the memory system 210 may supply power to both volatile memory devices 240 and non-volatile memory devices 240 within the memory system 210. To decrease the power consumption of the memory system 210 if operating in the second mode, the memory system 210 may decrease an amount of power supplied to the volatile memory devices within the memory system 210 (e.g., in comparison to the amount of power supplied to the volatile memory devices 240 in the first mode of operation), which may cause the volatile memory devices 240 to not retain data.

To avoid losing data stored in a volatile memory device 240 if the memory system 210 operates according to the second mode (e.g., the low-power mode), the memory system 210 may write an image of the memory system 210 stored in the volatile memory devices 240 and, in some cases, other volatile memory in the memory system 210 (e.g., the buffer queue 265, the buffer 225, the command queue 260, the storage queue 269) to a non-volatile memory device 240 prior to transitioning the memory system 210 from the first mode to the second, lower-power mode. The image may include data stored in the volatile memory device 240 (e.g., a state of the NAND memory device 240), data associated with the local controller of the volatile memory device 240 (e.g., a state of the NAND local controller associated with the volatile memory device 240), data stored in other volatile memory of the memory system 210 (e.g., data stored in the SRAM or cache), data associated with firmware tables of the memory system 210, configuration details associated with the memory system 210, or a combination thereof.

If the memory system 210 transitions back to the first mode of operation (e.g., and increases an amount of power supplied to the volatile memory device 240), the memory system 210 may write the image from the non-volatile memory device 240 back to the volatile memory device 240, thus preventing a loss of data due to operating the memory system 210 in the lower-power mode. In some instances, the process of writing the image of the memory system 210 stored in the volatile memory device 240 to non-volatile memory device 240 and writing the data back from the non-volatile memory device 240 to the volatile memory device 240 device may decrease a performance of the memory system 210. That is, storing the image in non-volatile memory device 240 may temporarily increase a power consumption on the memory system 210 (e.g., due to draining current to save the data in the volatile memory device 240). Additionally, performing access operations on the volatile memory device 240 (e.g., to write the image to the non-volatile memory device 240, to read the image from the non-volatile memory device 240) may decrease a reliability of the non-volatile memory device 240 over time. Further, writing and reading the image to and from the non-volatile memory device 240 may introduce latency to the memory system 210.

Additionally or alternatively, the memory system 210 may transmit the image to the host system 205 (e.g., to avoid or decrease a size of the image written to the non-volatile memory device 240, to decrease a latency associated with switching between operating modes) prior to operating the memory system 210 in the second or lower-power mode. In one case, the memory system 210 may transmit the image to the host system 205 and refrain from writing the image to the volatile memory device 240. In some other cases, the memory system 210 may transmit the image to the host system 205 in addition to writing the image to the volatile memory device 240.

The memory system 210 may transmit the image of the memory system 210 stored in volatile memory in response to a request received via the interface 220 from the host system 205 to transition the memory system 210 to a lower-power mode. For example, the host system 205 may transmit a read command that indicates for the memory system 210 to transmit the image of the memory system 210 stored in the volatile memory device 240 and indicates for the memory system 210 to operate in the lower-power mode. That is, the host system 205 may transmit a start stop unit with memory (SSUM) read command indicating for the memory system 210 to decrease a power consumption of the memory system 210 (e.g., indicating for the memory system 210 to enter a power down or sleep mode). In response to receiving the read command (e.g., the SSUM read command) via the interface 220, the memory system 210 may transmit, via the interface 220, the image of the memory system 210 to the host system 205. The image of the memory system 210 stored in volatile memory may include data stored in the volatile memory device 240 (e.g., a state of the NAND memory device 240), data associated with the local controller of the volatile memory device 240 (e.g., a state of the NAND local controller of the volatile memory device 240), data stored in other volatile memory of the memory system 210 (e.g., data stored in volatile memory at the memory system controller 215, data in the buffer queue 265, data in the storage queue 269, data in the command queue 260), data associated with firmware tables of the memory system 210, configuration details associated with the memory system 210, or a combination thereof.

Additionally, the memory system 210 may transition from operating the memory system 210 in the first mode to operating the memory system 210 in the second, lower-power mode in response to receiving the read command (e.g., the SSUM read command). For example, the memory system 210 may decrease an amount of power supplied to one or more volatile memory devices 240 (e.g., volatile memory device 240, one or more caches in the memory system 210, SRAM at the memory system).

If the memory system 210 is operating in the second, lower-power mode, the host system 205 may transmit a write command that includes the image of the memory system 210 stored in the volatile memory device 240 and indicates for the memory system 210 to operate in the first mode (e.g., corresponding to the nominal power consumption). That is, the host system 205 may transmit an SSUM write command indicating for the memory system 210 to increase a power consumption (e.g., an amount of power supplied to volatile memory in the memory system 210, an indication for the memory system 210 to exit a lower-power mode such as a sleep or hibernation mode). In response to receiving the write command via the interface 220, the memory system 210 may write the image to the volatile memory device 240 and transition from operating the memory system 210 in the second, lower-power mode to operating in the second, nominal-power mode. For example, the memory system 210 may increase an amount of power supplied to the volatile memory device 240, and any other volatile memory devices 240 or volatile memory such as a cache or SRAM in the memory system 210 in response to receiving the write command (e.g., the SSUM write command) via the interface 220 from the host system 205.

Thus, the memory system 210 may retain data stored in the volatile memory device 240 while operating in the lower-power mode without relying on writing the image to and from the volatile memory device 240. In some instances this may reduce latency associated with the memory system 210, decrease power consumption at the memory system 210 if transitioning between the first and second modes of operation, and improve a reliability of the non-volatile memory device 240 over time.

In some instances, the memory system 210 may indicate, to the host system 205 a capability of the memory system 210 to enter and exit lower-power modes of operation in response to read and write commands (e.g., SSUM read and SSUM write commands). Here, the host system 205 may transmit the SSUM read and SSUM write commands in response to the memory system 210 indicating the capability (e.g., as opposed to transmitting other commands to transition the memory system 210 between modes of operation not associated with the transmission of the image between the memory system 210 and the host system 205).

In one example, the memory system 210 may indicate the capability of the memory system 210 via a register 270 at the memory system 210. Here, the memory system 210 may set a register 270 associated with this capability information (e.g., an SSUM_Capability register 270) to a value indicating that the memory system 210 is capable of entering and exiting lower-power modes in response to the read and write commands and the host system 205 may identify the capability of the memory system 210 by polling or reading the register 270. In another example, the memory system 210 may indicate the capability of the memory system 210 via a flag 275. Here, the memory system 210 may set the flag 275 to indicate the capability of the memory system 210 to execute the SSUM read and write commands and the host system 205 may poll the memory system 210 (e.g., a storage location of the memory system 210, a register 270 of the memory system 210) that may include the flag to determine the capability of the memory system 210. In another example, the memory system 210 may indicate the capability of the memory system 210 by transmitting signaling to the host system 205 via the interface 220 indicating the capability of the memory system 210 to enter and exit lower-power modes in response to the read and write commands (e.g., the SSUM read and SSUM write commands).

The memory system 210 may indicate, to the host system 205, a threshold size of the image of the memory system 210 transmitted between the host system 205 and the memory system 210 during an execution of the read and write commands (e.g., the SSUM read and write commands). For example, the memory system 210 may indicate a maximum size of the image transmitted to the host system 205 in response to the read command. The threshold size indicated by the memory system 210 may be a multiple of a data size (e.g., may have a granularity) of data exchanged between the host system 205 and the memory system 210 (e.g., 4 kilobytes). In some cases, the host system 205 may indicate a size for the image in the read command (e.g., in the SSUM read command). If the memory system 210 indicates the threshold size of the image to the host system 205, the indicated size of the image in the read command may be less than or equal to the threshold size indicated by the memory system 210.

In one example, the memory system 210 may indicate the threshold size via a register 270 at the memory system 210. Here, the memory system 210 may set a register 270 associated with this threshold size information to a value indicating the threshold size and the host system 205 may identify the threshold size by polling or reading the register 270. In another example, the memory system 210 may indicate the threshold size by transmitting signaling via the interface 220 to the host system 205 indicating the threshold size.

FIG. 3 illustrates an example of a process flow 300 that supports suspend operation with data transfer to a host system in accordance with examples as disclosed herein. In some examples, the process flow may implement aspects of a systems 100 and 200. For example, the process flow 300 may include a host system 305 and a memory system 310, which may be examples of a host system and memory system as described with reference to FIGS. 1 and 2. The process flow 300 may illustrate an example of a memory system transitioning between operating according to a first mode of operation associated with a nominal power consumption and a second, lower power mode of operation associated with a decreased power consumption. Alternative examples of the following may be implemented, where some steps are performed in a different order than described or are not performed at all. In some cases, steps may include additional features not mentioned below, or further steps may be added.

Aspects of the process flow 300 may be implemented by a controller, among other components. Additionally or alternatively, aspects of the process flow 300 may be implemented as instructions stored in memory (e.g., firmware stored in a memory coupled with a memory system controller). For example, the instructions, when executed by a controller (e.g., the memory system controller 115 or 215), may cause the controller to perform the operations of the process flow 300.

At 315, a memory system 310 may be operated according to a first mode associated with a first power consumption (e.g., a nominal power consumption). That is, the memory system 310 may supply a power to operate both volatile and non-volatile memory devices of the memory system 310.

At 320, capability information may optionally be indicated to the host system 305. That is, the memory system 310 may indicate, to the host system 305, a capability of the memory system 310 to execute read and write commands associated with entering and exiting a lower-power mode of operation, respectively (e.g., SSUM read and write commands). For example, the memory system 310 may indicate to the host system 305, that the memory system 310 is capable of executing a read command associated with transitioning the memory system 310 to the lower-power mode of operation (e.g., an SSUM read command).

In one example, the memory system 310 may indicate the capability of the memory system 310 via a register (e.g., an SSUM Capability register) at the memory system 310. For example, the memory system 310 may set the register to a value indicating that the memory system 310 is capable of entering and exiting lower-power modes in response to the read and write commands received from the host system 305. Additionally, the host system 305 may identify the capability of the memory system 310 by polling or reading the register. In another example, the memory system 310 may indicate the capability of the memory system 310 via a flag. Here, the memory system 310 may set the flag to indicate the capability of the memory system 310 to execute the SSUM read and write commands and the host system 305 may poll the memory system 310 (e.g., a storage location of the memory system 310, a register of the memory system 310) that may include the flag to determine the capability of the memory system 310. In another example, the memory system 310 may indicate the capability of the memory system 310 by transmitting signaling to the host system 305 indicating the capability of the memory system 310 to enter and exit lower-power modes in response to the read and write commands (e.g., the SSUM read and SSUM write commands).

At 325, an image size threshold may optionally be indicated to the host system 305. For example, the memory system 310 may indicate, to the host system 305, a threshold size of an image of the memory system 310. That is, the memory system 310 may support transmitting, to the host system 305 in response to receiving a read command, an image of the memory system 310 that is stored in volatile memory at the memory system 310 if operating the memory system 310 according to the first mode of operation. The image of the memory system 310 stored in volatile memory may include data stored in volatile memory of the memory system 310, data associated with local controllers associated with the volatile memory (e.g., a state of a NAND local controller), data stored in other volatile memory of the memory system 310 (e.g., data stored in the SRAM or cache such as an L2P cache), data associated with firmware tables of the memory system 310, configuration details associated with the memory system 310, or a combination thereof.

Thus, at 325 the memory system 310 may optionally indicate to the host system 305 the threshold size of the image, where the memory system 310 may be configured to transmit an image that is less than or equal to the threshold size. The threshold size indicated by the memory system 310 may be a multiple of a data size (e.g., may have a granularity) of data exchanged between the host system 305 and the memory system 310 (e.g., 4 kilobytes).

In one example, the memory system 310 may indicate the threshold size via a register at the memory system 310. Here, the memory system 310 may set the register associated with this threshold size information to a value indicating the threshold size and the host system 305 may identify the threshold size by polling or reading the register. In another example, the memory system 310 may indicate the threshold size by transmitting signaling to the host system 305 indicating the threshold size.

At 330, a read command may be transmitted by the host system 305 and received by the memory system 310. For example, the host system 305 may transmit the read command indicating for the memory system 310 to transmit the image of the memory system 310 stored in volatile memory device 130-a and indicating for the memory system 310 to transition to a second, lower-power mode of operation. In some cases, the read command may be an SSUM read command indicating for the memory system 310 to decrease a power consumption of the memory system 310 (e.g., by transitioning the memory system 310 to a power down mode, to a hibernation mode, to a suspend mode, to a sleep mode). The read command may include an indication of a size of the image to be transmitted to the host system 305 in response to the read command. For example, the read command may indicate a quantity of pages (e.g., each having a size associated with the interface between the memory system 310 and the host system 305) associated with the image to be transmitted by the memory system 310 in response to the read command.

In response to receiving the read command, firmware at the memory system 310 may facilitate a reading of one or more portions of volatile memory in the memory system 310 to identify a set of data. Additionally, the firmware may position (e.g., pack) and align the data to generate the image associated with the memory system 310 stored in volatile memory if the memory system 310 is operating according to the first mode.

In some cases, error control information may be generated by the memory system 310 in response to receiving the read command from the host system 305. For example, the memory system 310 may generate error control information corresponding to the image (e.g., a checksum of the image, error correction information associated with the image). In this case, the firmware at the memory system 310 may additionally append the error control information to the image based on generating the error control information.

At 335, an image of the memory system 310 stored in volatile memory may optionally be stored in non-volatile memory of the memory system 310. That is, the memory system 310 may write the image to non-volatile memory in the memory system 310 in response to receiving the read command at 330. In some cases, writing the image of the memory system 310 to non-volatile memory may additionally increase a reliability of the memory system 310 if transitioning to a lower-power mode. That is, the memory system 310 may retain the image even in cases that the host system 305 fails to retain the image (e.g., due to a loss of power).

At 340, mapping information associated with the image may be stored at the memory system 310. The mapping information may indicate where the data in the image is to be stored in the volatile memory of the memory system 310 (e.g., to transition back from the second lower-power mode). The memory system 310 may store the mapping information in non-volatile memory (e.g., ROM), which may retain the mapping information while the memory system 310 operates in the second, lower-power mode. Additionally, the memory system 310 may store the mapping information in volatile memory (e.g., in SRAM) that receives an amount of power necessary to retain the mapping information during the operation of the memory system 310 in the second, lower power mode. For example, the memory system 310 may optionally store information indicating a positioning (e.g., a packing) or alignment of the image in the volatile memory of the memory system 310. In cases that the memory system 310 generates error control information associated with the image at 330, the memory system 310 may additionally store the error control information at the memory system 310 at 340. For example, the memory system 310 may store the error control information in non-volatile memory or volatile memory that receives the amount of power necessary to retain the mapping information during the operation of the memory system 310 in the second, lower power mode.

At 345, an image of the memory system 310 stored in volatile memory may be transmitted to the host system 305 by the memory system 310. That is, the read command received by the memory system 310 at 330 may indicate for the memory system 310 to transmit the image to the host system 305. Thus, in response to receiving the read command at 330, the memory system 310 may transmit the image of the memory system 310 stored in volatile memory to the host system 305. In some cases, the size of the image transmitted to the host system 305 at 345 may be less than or equal to the threshold size associated with the image indicated by the memory system at 325. Additionally, the image may have a granularity associated with data transmitted between the host system 305 and the memory system 310 (e.g., four kilobytes).

In some cases, the memory system 310 may additionally transmit the mapping information to the host system 305 at 345. For example, in cases that the memory system 310 does not store the mapping information at 340, the memory system 310 may transmit the mapping information to the host system 305. In some instances, the memory system 310 may transmit the mapping information in a header associated the image to the host system 305 at 345. Additionally, the memory system may transmit the error control information corresponding to the image to the host system 305 at 345.

In response to receiving the image of the memory system 310 (and optionally the mapping information), the host system 305 may store the image and, in some cases, the mapping information, error control information, or both (e.g., in DRAM at the host system 305).

At 350, the memory system 310 may be operated according to the second mode. That is, the memory system 310 may transition from operating according to the first mode to operating according to the second mode. In some cases, the memory system 310 may decrease an amount of power supplied to one or more portions of volatile memory if operating according to the second, lower-power mode (e.g., compared to the amount of power supplied to the one or more portions of the volatile memory if operating according to the first mode).

In some cases, the memory system 310 may be capable of operating according to more than one lower-power mode. For example, the memory system 310 may be configured to operate according to one lower-power mode where the memory system 310 supplies no power to volatile memory if operating according to this lower-power mode. Additionally, the memory system 310 may be configured to operate according to another lower-power mode where, if operating according to this lower-power mode, the memory system 310 supplies the volatile memory power, but less power than the amount of power supplied if operating according to the first mode. In cases that the memory system 310 is capable of operating according to more than one lower-power mode, the host system 305 may indicate a specific lower-power mode within the read command at 330. Here, the memory system 310 may operate according to the lower-power mode indicated within the read command.

At 355, a write command may be received by the memory system 310. That is, the memory system 310 may receive the write command from the host system 305 while operating the memory system 310 according to the second, lower-power mode. The write command associated with transitioning the memory system 310 to operate according to the first mode of operation (e.g., may be an SSUM write command). For example, the write command may indicate for the memory system 310 to transition from the second mode of operation to the first mode operation and may additionally include the image (e.g., sent from the memory system 310 to the host system 305 at 345). Additionally, in cases that the memory system 310 transmits the mapping information associated with the image to the host system 305 at 345, the write command may additionally include the mapping information.

Additionally, in cases that the memory system 310 transmits the error control information corresponding to the image to the host system 305 at 345, the write command may additionally include the error control information. In these cases, the memory system 310 may perform an error control operation on the image of the memory system 310 included in the write command. For example, the error control information may include a checksum associated with the image of the memory system 310. Here, the memory system 310 may perform the error control operation by comparing the image to the checksum included in the write command to identify (e.g., validate) an integrity of the image included in the write command. Additionally or alternatively, the memory system 315 may perform an error control operation by detecting and in some cases, correcting one or more errors in the image of the memory system 310 included in the write operation.

At 360, the image of the memory system 310 may be written to volatile memory at the memory system 310. That is in response to receiving the write command, the memory system 310 may write the image to the volatile memory according to the mapping information (e.g., received within the write command, read from non-volatile memory in the memory system 310). For example, firmware associated with the memory system 310 may receive the image, and facilitate the writing of data within the image based on or in response to the mapping information associated with the image. Thus, the memory system 310 may restore the volatile memory within the memory system 310 to a state associated with operating the memory system 310 according to the first mode of operation. For example, the memory system 310 may restore a cache (e.g., an L2P cache) associated with the memory system 310 based on or in response to data within the image. Additionally, the memory system 310 may write data to other volatile memory devices, controllers associated with the volatile memory devices, firmware associated with the memory system 310, or a combination thereof.

At 365, the memory system 310 may be operated according to the first mode. For example, in response to receiving the write command from the host system 305 at 355, the memory system 310 may transition the memory system 310 from operating according to the second, lower-power mode, to operating the memory system 310 according to the first mode.

Here, the memory system 310 may supply volatile memory in the memory system 310 with more power compared to the amount of power supplied if operating the memory system 310 according to the second, lower-power mode.

Figure 4:
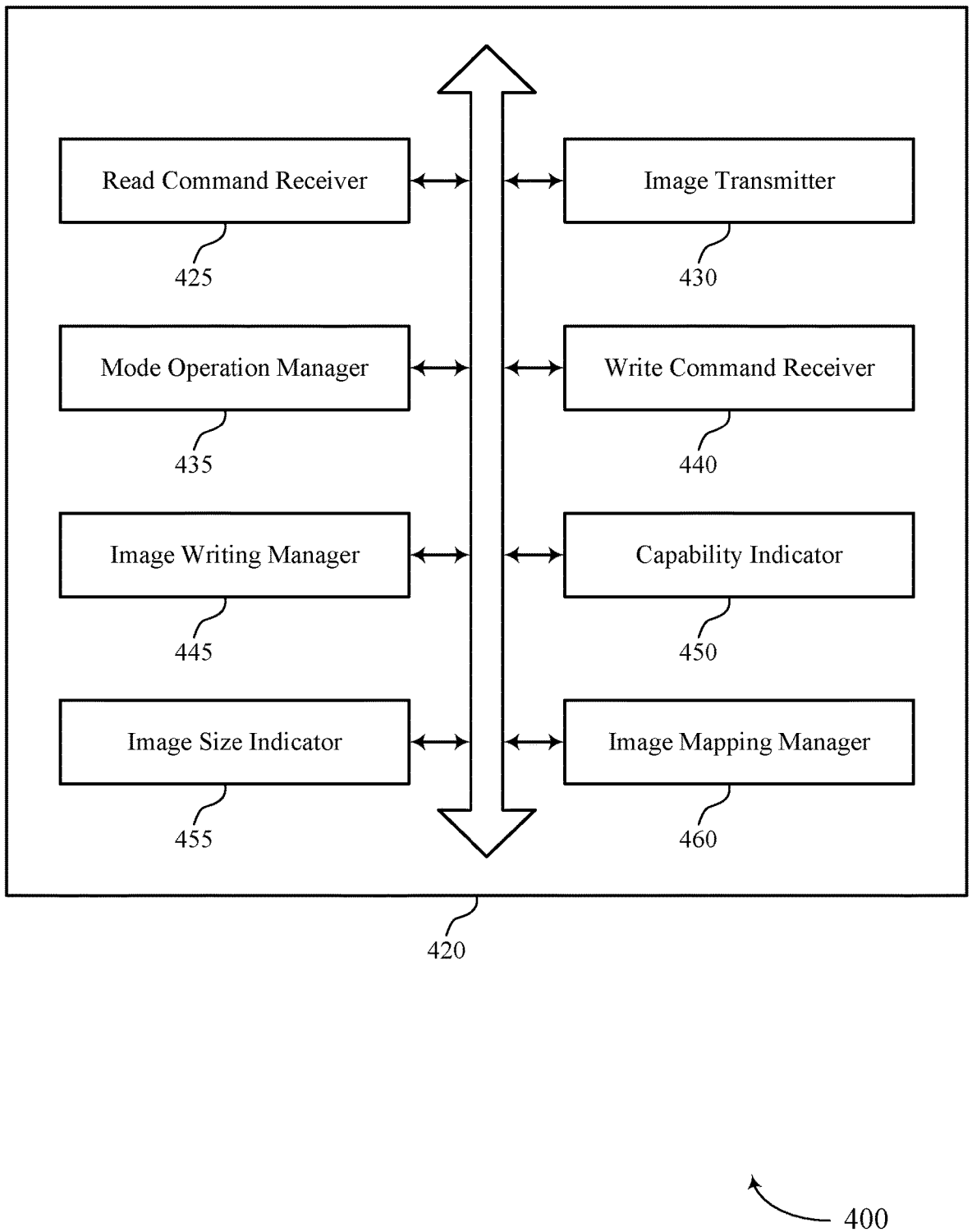
FIG. 4 shows a block diagram of a memory system that supports suspend operation with data transfer to a host system in accordance with examples as disclosed herein.

FIG. 4 shows a block diagram 400 of a memory system 420 that supports suspend operation with data transfer to a host system in accordance with examples as disclosed herein. The memory system 420 may be an example of aspects of a memory system as described with reference to FIGS. 1 through 3. The memory system 420, or various components thereof, may be an example of means for performing various aspects of suspend operation with data transfer to a host system as described herein. For example, the memory system 420 may include a read command receiver 425, an image transmitter 430, a mode operation manager 435, a write command receiver 440, an image writing manager 445, a capability indicator 450, an image size indicator 455, an image mapping manager 460, or any combination thereof. Each of these components may communicate, directly or indirectly, with one another (e.g., via one or more buses).

The read command receiver 425 may be configured as or otherwise support a means for receiving, from a host system while operating a memory system according to a first mode of operation associated with a first power consumption, a read command associated with transitioning the memory system to operate according to a second mode of operation associated with a second power consumption lower than the first power consumption. The image transmitter 430 may be configured as or otherwise support a means for transmitting, to the host system based at least in part on receiving the read command, an image of the memory system stored in volatile memory based at least in part on operating the memory system according to the first mode of operation. The mode operation manager 435 may be configured as or otherwise support a means for operating the memory system according to the second mode of operation in response to receiving the read command and based at least in part on transmitting the image of the memory system.

In some examples, the capability indicator 450 may be configured as or otherwise support a means for indicating, to the host system, a capability of the memory system to execute read commands associated with transitioning the memory system to operate according to the second mode of operation, where receiving the read command is based at least in part on the indicating.

In some examples, to support indicating the capability of the memory system, the capability indicator 450 may be configured as or otherwise support a means for storing, at a register, a value indicating the capability of the memory system to execute the read commands associated with transitioning the memory system to operate according to the second mode of operation.

In some examples, to support indicating the capability of the memory system, the capability indicator 450 may be configured as or otherwise support a means for transmitting, to the host system, signaling indicating the capability of the memory system to execute the read commands associated with transitioning the memory system to operate according to the second mode of operation.

In some examples, the image size indicator 455 may be configured as or otherwise support a means for indicating, to the host system, a threshold size of the image of the memory system transmitted to the host system in response to one or more read commands associated with transitioning the memory system to operate according to the second mode of operation, where receiving the read command is based at least in part on indicating the threshold size.

In some examples, to support indicating the threshold size of the image of the memory system, the image size indicator 455 may be configured as or otherwise support a means for storing, at a register, a value indicating the threshold size of the image, where the indicating is based at least in part on storing the value at the register.

In some examples, to support indicating the threshold size of the image of the memory system, the image size indicator 455 may be configured as or otherwise support a means for transmitting, to the host system, signaling indicating the threshold size of the image.

In some examples, the read command includes a field indicating the threshold size of the image of the memory system transmitted to the host system in response to the read command.

In some examples, the write command receiver 440 may be configured as or otherwise support a means for receiving, from the host system while operating the memory system according to the second mode of operation, a write command associated with transitioning the memory system to operate according to the first mode of operation, the write command including the image of the memory system. In some examples, the image writing manager 445 may be configured as or otherwise support a means for writing, based at least in part on receiving the write command, the image of the memory system to the volatile memory. In some examples, the mode operation manager 435 may be configured as or otherwise support a means for operating the memory system according to the first mode of operation in response to receiving the write command and based at least in part on writing the image of the memory system to the volatile memory.

In some examples, the read command receiver 425 may be configured as or otherwise support a means for generating, based at least in part on receiving the read command, error control information corresponding to the image of the memory system. Here, transmitting the image of the memory system to the host system may further comprise transmitting the error control information to the host system. In some examples, the image writing manager 445 may be configured as or otherwise support a means for performing, based at least in part on receiving the write command that further comprises the error control information, an error control operation on the image of the memory system using the error control information, where writing the image of the memory system to the volatile memory is based at least in part on performing the error control operation In some examples, the image mapping manager 460 may be configured as or otherwise support a means for storing, in non-volatile memory based at least in part on receiving the read command, data indicating a mapping between the image of the memory system and the volatile memory to enable the memory system to write the image of the memory system to the volatile memory after operating the memory system according to the second mode of operation.

In some examples, the image mapping manager 460 may be configured as or otherwise support a means for transmitting, to the host system based at least in part on receiving the read command, signaling associated with the image of the memory system indicating a mapping between the image of the memory system and the volatile memory.

In some examples, the mode operation manager 435 may be configured as or otherwise support a means for storing the image of the memory system in non-volatile memory based at least in part on receiving the read command, where operating the memory system according to the second mode of operation is based at least in part on the storing.

In some examples, the image includes data stored in the volatile memory based on or in response to the memory system receiving the read command, data associated with a controller of the volatile memory based on or in response to the memory system receiving the read command, data stored in a logical to physical mapping table of the memory system based on or in response to the memory system receiving the read command, data associated with a configuration of the volatile memory based on or in response to the memory system receiving the read command, or any combination thereof.

The write command receiver 440 may be configured as or otherwise support a means for receiving, from a host system while operating a memory system according to a first mode of operation associated with a first power consumption, a write command associated with transitioning the memory system to operate according to a second mode of operation associated with a second power consumption greater than the first power consumption, the write command including an image of the memory system associated with operating the memory system according to the second mode of operation. The image writing manager 445 may be configured as or otherwise support a means for writing, based at least in part on receiving the write command, the image of the memory system to volatile memory in the memory system. In some examples, the mode operation manager 435 may be configured as or otherwise support a means for operating the memory system according to the second mode of operation in response to receiving the write command and based at least in part on writing the image of the memory system to the volatile memory.

In some examples, the image mapping manager 460 may be configured as or otherwise support a means for reading, from non-volatile memory in the memory system, data indicating a mapping between the image of the memory system and the volatile memory, where writing the image of the memory system is based at least in part on the reading.

In some examples, the image mapping manager 460 may be configured as or otherwise support a means for receiving, from the host system, signaling associated with the image of the memory system indicating a mapping between the image of the memory system and the volatile memory.

In some examples, the image includes data stored in the volatile memory to operate the memory system according to the second mode of operation, data associated with a controller of the volatile memory to operate the memory system according to the second mode of operation, data stored in a logical to physical mapping table of the memory system to operate the memory system according to the second mode of operation, data associated with a configuration of the volatile memory to operate the memory system according to the second mode of operation, or any combination thereof.

In some examples, the read command receiver 425 may be configured as or otherwise support a means for receiving, from the host system while operating the memory system according to the second mode of operation, a read command associated with transitioning the memory system to operate according to the first mode of operation. In some examples, the image transmitter 430 may be configured as or otherwise support a means for transmitting, to the host system based at least in part on receiving the read command, the image of the memory system. In some examples, the mode operation manager 435 may be configured as or otherwise support a means for operating the memory system according to the first mode of operation in response to receiving the read command and based at least in part on transmitting the image of the memory system, where receiving the write command is based at least in part on operating the memory system according to the first mode of operation.

Figure 5:
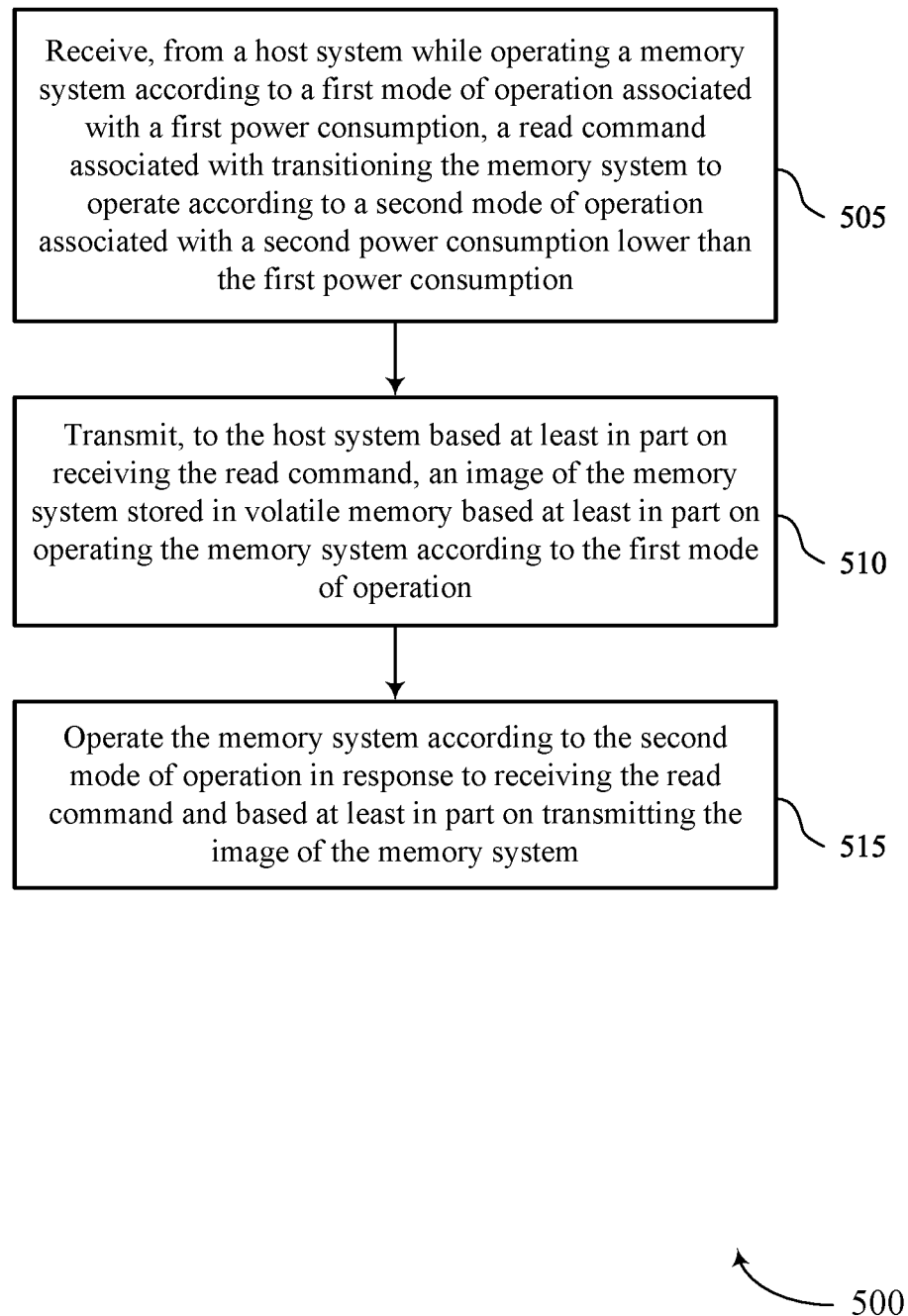
FIGS. 5 and 6 show flowcharts illustrating a method or methods that support suspend operation with data transfer to a host system in accordance with examples as disclosed herein.

FIG. 5 shows a flowchart illustrating a method 500 that supports suspend operation with data transfer to a host system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include receiving, from a host system while operating a memory system according to a first mode of operation associated with a first power consumption, a read command associated with transitioning the memory system to operate according to a second mode of operation associated with a second power consumption lower than the first power consumption. The operations of 505 may be performed in accordance with examples as disclosed herein. In some examples, aspects of the operations of 505 may be performed by a read command receiver 425 as described with reference to FIG. 4.

At 510, the method may include transmitting, to the host system based at least in part on receiving the read command, an image of the memory system stored in volatile memory based at least in part on operating the memory system according to the first mode of operation. The operations of 510 may be performed in accordance with examples as disclosed herein. In some examples, aspects of the operations of 510 may be performed by an image transmitter 430 as described with reference to FIG. 4.

At 515, the method may include operating the memory system according to the second mode of operation in response to receiving the read command and based at least in part on transmitting the image of the memory system. The operations of 515 may be performed in accordance with examples as disclosed herein. In some examples, aspects of the operations of 515 may be performed by a mode operation manager 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving, from a host system while operating a memory system according to a first mode of operation associated with a first power consumption, a read command associated with transitioning the memory system to operate according to a second mode of operation associated with a second power consumption lower than the first power consumption, transmitting, to the host system based at least in part on receiving the read command, an image of the memory system stored in volatile memory based at least in part on operating the memory system according to the first mode of operation, and operating the memory system according to the second mode of operation in response to receiving the read command and based at least in part on transmitting the image of the memory system.

Some examples of the method 500 and the apparatus described herein may further include operations, features, circuitry, logic, means, or instructions for indicating, to the host system, a capability of the memory system to execute read commands associated with transitioning the memory system to operate according to the second mode of operation, where receiving the read command may be based at least in part on the indicating.

In some examples of the method 500 and the apparatus described herein, indicating the capability of the memory system may include operations, features, circuitry, logic, means, or instructions for storing, at a register, a value indicating the capability of the memory system to execute the read commands associated with transitioning the memory system to operate according to the second mode of operation.

In some examples of the method 500 and the apparatus described herein, indicating the capability of the memory system may include operations, features, circuitry, logic, means, or instructions for transmitting, to the host system, signaling indicating the capability of the memory system to execute the read commands associated with transitioning the memory system to operate according to the second mode of operation.

Some examples of the method 500 and the apparatus described herein may further include operations, features, circuitry, logic, means, or instructions for indicating, to the host system, a threshold size of the image of the memory system transmitted to the host system in response to one or more read commands associated with transitioning the memory system to operate according to the second mode of operation, where receiving the read command may be based at least in part on indicating the threshold size.

In some examples of the method 500 and the apparatus described herein, indicating the threshold size of the image of the memory system may include operations, features, circuitry, logic, means, or instructions for storing, at a register, a value indicating the threshold size of the image, where the indicating may be based at least in part on storing the value at the register.

In some examples of the method 500 and the apparatus described herein, indicating the threshold size of the image of the memory system may include operations, features, circuitry, logic, means, or instructions for transmitting, to the host system, signaling indicating the threshold size of the image.

In some examples of the method 500 and the apparatus described herein, the read command includes a field indicating the threshold size of the image of the memory system transmitted to the host system in response to the read command.

Some examples of the method 500 and the apparatus described herein may further include operations, features, circuitry, logic, means, or instructions for receiving, from the host system while operating the memory system according to the second mode of operation, a write command associated with transitioning the memory system to operate according to the first mode of operation, the write command including the image of the memory system, writing, based at least in part on receiving the write command, the image of the memory system to the volatile memory, and operating the memory system according to the first mode of operation in response to receiving the write command and based at least in part on writing the image of the memory system to the volatile memory.

Some examples of the method 500 and the apparatus described herein may further include operations, features, circuitry, logic, means, or instructions for generating, based at least in part on receiving the read command, error control information corresponding to the image of the apparatus, where transmitting the image of the apparatus to the host system further comprises transmitting the error control information to the host system and performing, based at least in part on receiving the write command further comprising the error control information, an error control operation on the image of the apparatus using the error control information, where writing the image of the apparatus to the memory device is based at least in part on performing the error control operation.

Some examples of the method 500 and the apparatus described herein may further include operations, features, circuitry, logic, means, or instructions for storing, in non-volatile memory based at least in part on receiving the read command, data indicating a mapping between the image of the memory system and the volatile memory to enable the memory system to write the image of the memory system to the volatile memory after operating the memory system according to the second mode of operation.

Some examples of the method 500 and the apparatus described herein may further include operations, features, circuitry, logic, means, or instructions for transmitting, to the host system based at least in part on receiving the read command, signaling associated with the image of the memory system indicating a mapping between the image of the memory system and the volatile memory.

Some examples of the method 500 and the apparatus described herein may further include operations, features, circuitry, logic, means, or instructions for storing the image of the memory system in non-volatile memory based at least in part on receiving the read command, where operating the memory system according to the second mode of operation may be based at least in part on the storing.

In some examples of the method 500 and the apparatus described herein, the image includes data stored in the volatile memory based on or in response to the memory system receiving the read command, data associated with a controller of the volatile memory based on or in response to the memory system receiving the read command, data stored in a logical to physical mapping table of the memory system based on or in response to the memory system receiving the read command, data associated with a configuration of the volatile memory based on or in response to the memory system receiving the read command, or any combination thereof.

Figure 6:
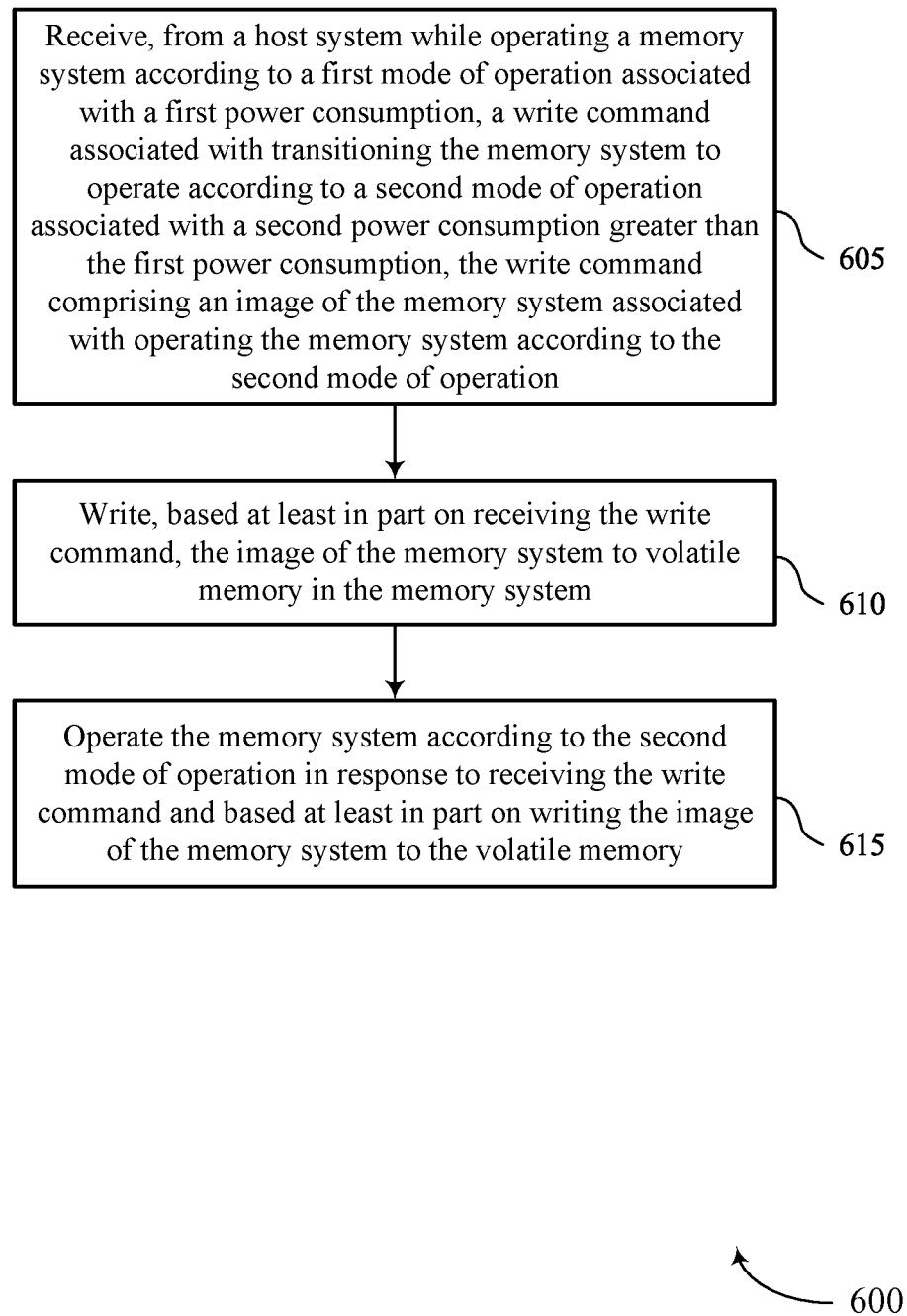

FIG. 6 shows a flowchart illustrating a method 600 that supports suspend operation with data transfer to a host system in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 605, the method may include receiving, from a host system while operating a memory system according to a first mode of operation associated with a first power consumption, a write command associated with transitioning the memory system to operate according to a second mode of operation associated with a second power consumption greater than the first power consumption, the write command including an image of the memory system associated with operating the memory system according to the second mode of operation. The operations of 605 may be performed in accordance with examples as disclosed herein. In some examples, aspects of the operations of 605 may be performed by a write command receiver 440 as described with reference to FIG. 4.

At 610, the method may include writing, based at least in part on receiving the write command, the image of the memory system to volatile memory in the memory system. The operations of 610 may be performed in accordance with examples as disclosed herein. In some examples, aspects of the operations of 610 may be performed by an image writing manager 445 as described with reference to FIG. 4.

At 615, the method may include operating the memory system according to the second mode of operation in response to receiving the write command and based at least in part on writing the image of the memory system to the volatile memory. The operations of 615 may be performed in accordance with examples as disclosed herein. In some examples, aspects of the operations of 615 may be performed by a mode operation manager 435 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, from a host system while operating a memory system according to a first mode of operation associated with a first power consumption, a write command associated with transitioning the memory system to operate according to a second mode of operation associated with a second power consumption greater than the first power consumption, the write command including an image of the memory system associated with operating the memory system according to the second mode of operation, writing, based at least in part on receiving the write command, the image of the memory system to volatile memory in the memory system, and operating the memory system according to the second mode of operation in response to receiving the write command and based at least in part on writing the image of the memory system to the volatile memory.

In some examples of the method 600 and the apparatus described herein, reading, from non-volatile memory in the memory system, data indicating a mapping between the image of the memory system and the volatile memory, where writing the image of the memory system may be based at least in part on the reading.

Some examples of the method 600 and the apparatus described herein may further include operations, features, circuitry, logic, means, or instructions for receiving, from the host system, signaling associated with the image of the memory system indicating a mapping between the image of the memory system and the volatile memory.

In some examples of the method 600 and the apparatus described herein, the image includes data stored in the volatile memory to operate the memory system according to the second mode of operation, data associated with a controller of the volatile memory to operate the memory system according to the second mode of operation, data stored in a logical to physical mapping table of the memory system to operate the memory system according to the second mode of operation, data associated with a configuration of the volatile memory to operate the memory system according to the second mode of operation, or any combination thereof.

Some examples of the method 600 and the apparatus described herein may further include operations, features, circuitry, logic, means, or instructions for receiving, from the host system while operating the memory system according to the second mode of operation, a read command associated with transitioning the memory system to operate according to the first mode of operation, transmitting, to the host system based at least in part on receiving the read command, the image of the memory system, and operating the memory system according to the first mode of operation in response to receiving the read command and based at least in part on transmitting the image of the memory system, where receiving the write command may be based at least in part on operating the memory system according to the first mode of operation.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory device comprising volatile memory cells; and
    a controller coupled with the memory device and configured to cause the apparatus to:
        transmit capability information that indicates a capability of the apparatus to transition between modes of operation based at least in part on a read command;
        receive, while operating the apparatus according to a first mode of operation associated with a first power consumption and based at least in part on the capability information, the read command that indicates the controller to transition the apparatus to operate according to a second mode of operation associated with a second power consumption lower than the first power consumption, wherein the read command comprises a request for an image of the apparatus;
        transmit, based at least in part on receiving the read command, the image of the apparatus stored in the memory device based at least in part on operating the apparatus according to the first mode of operation; and
        operate the apparatus according to the second mode of operation in response to receiving the read command and based at least in part on transmitting the image of the apparatus.

2. The apparatus of claim 1, wherein, to transmit the capability information, the controller is further configured to cause the apparatus to:
    store, at a register, a value indicating the capability of the apparatus to execute the read command associated with transitioning the apparatus to operate according to the second mode of operation.

3. The apparatus of claim 1, wherein, transmit the capability information, the controller is further configured to cause the apparatus to:
    transmit signaling comprising the capability information that indicates the capability of the apparatus to execute the read command associated with transitioning the apparatus to operate according to the second mode of operation.

4. The apparatus of claim 1, wherein the controller is further configured to cause the apparatus to:
    indicate a threshold size of the image of the apparatus transmitted in response to one or more read commands associated with transitioning the apparatus to operate according to the second mode of operation, wherein receiving the read command is based at least in part on indicating the threshold size.

5. The apparatus of claim 4, wherein, to indicate the threshold size of the image of the apparatus, the controller is further configured to cause the apparatus to:
    store, at a register, a value indicating the threshold size of the image, wherein the indicating is based at least in part on storing the value at the register.

6. The apparatus of claim 4, wherein, to indicate the threshold size of the image of the apparatus, the controller is further configured to cause the apparatus to:
    transmit signaling indicating the threshold size of the image.

7. The apparatus of claim 1, wherein the controller is further configured to cause the apparatus to:
    receive, while operating the apparatus according to the second mode of operation, a write command associated with transitioning the apparatus to operate according to the first mode of operation, the write command comprising the image of the apparatus;
    write, based at least in part on receiving the write command, the image of the apparatus to the memory device; and
    operate the apparatus according to the first mode of operation in response to receiving the write command and based at least in part on writing the image of the apparatus to the memory device.

8. The apparatus of claim 7, wherein the controller is further configured to cause the apparatus to:
    generate, based at least in part on receiving the read command, error control information corresponding to the image of the apparatus, wherein transmitting the image of the apparatus further comprises transmitting the error control information; and perform, based at least in part on receiving the write command further comprising the error control information, an error control operation on the image of the apparatus using the error control information, wherein writing the image of the apparatus to the memory device is based at least in part on performing the error control operation.

9. The apparatus of claim 1, wherein the controller is further configured to cause the apparatus to:

store, in the memory device based at least in part on receiving the read command, data indicating a mapping between the image of the apparatus and the memory device to enable the apparatus to write the image of the apparatus to the memory device after operating the apparatus according to the second mode of operation.

10. The apparatus of claim 1, wherein the controller is further configured to cause the apparatus to:

transmit, based at least in part on receiving the read command, signaling associated with the image of the apparatus indicating a mapping between the image of the apparatus and the memory device.

11. The apparatus of claim 1, wherein the controller is further configured to cause the apparatus to:

store the image of the apparatus in non-volatile memory based at least in part on receiving the read command, wherein operating the apparatus according to the second mode of operation is based at least in part on the storing.

12. The apparatus of claim 1, wherein the image comprises data stored in the memory device when the apparatus receives the read command, data associated with a second controller of the memory device when the apparatus receives the read command, data stored in a logical to physical mapping table of the apparatus when the apparatus receives the read command, data associated with a configuration of the memory device when the apparatus receives the read command, or any combination thereof.

13. An apparatus, comprising:

a memory device comprising volatile memory cells; and a controller coupled with the memory device and configured to cause the apparatus to:

indicate a threshold size of an image of the apparatus transmitted in response to one or more read commands associated with transitioning the apparatus to operate according to a second mode of operation;

receive, while operating the apparatus according to a first mode of operation associated with a first power consumption, a read command associated with transitioning the apparatus to operate according to a second mode of operation associated with a second power consumption lower than the first power consumption, wherein receiving the read command is based at least in part on indicating the threshold size;

transmit, based at least in part on receiving the read command, the image of the apparatus stored in the memory device based at least in part on operating the apparatus according to the first mode of operation, wherein the read command comprises a field indicating the threshold size of the image of the apparatus transmitted in response to the read command; and operate the apparatus according to the second mode of operation in response to receiving the read command and based at least in part on transmitting the image of the apparatus.

14. An apparatus, comprising:

a memory device comprising volatile memory cells; and a controller coupled with the memory device and configured to cause the apparatus to:

transmit capability information that indicates a capability of the apparatus to transition between modes of operation based at least in part on a write command;

receive, while operating the apparatus according to a first mode of operation associated with a first power consumption and based at least in part on the capability information, the write command that indicates the controller to transition the apparatus to operate according to a second mode of operation associated with a second power consumption greater than the first power consumption, the write command comprising an image of the apparatus associated with operating the apparatus according to the second mode of operation;

write, based at least in part on receiving the write command, the image of the apparatus to the memory device; and operate the apparatus according to the second mode of operation in response to receiving the write command and based at least in part on writing the image of the apparatus to the memory device.

15. The apparatus of claim 14, wherein the controller is further configured to cause the apparatus to:

reading, from the memory device, data that indicates a mapping between the image of the apparatus and the memory device, wherein writing the image of the apparatus is based at least in part on the reading.

16. The apparatus of claim 14, wherein the controller is further configured to cause the apparatus to:

receive signaling associated with the image of the apparatus indicating a mapping between the image of the apparatus and the memory device.

17. The apparatus of claim 14, wherein the image comprises data stored in the memory device to operate the apparatus according to the second mode of operation, data associated with a second controller of the memory device to operate the apparatus according to the second mode of operation, data stored in a logical to physical mapping table of the apparatus to operate the apparatus according to the second mode of operation, data associated with a configuration of the memory device to operate the apparatus according to the second mode of operation, or any combination thereof.

18. The apparatus of claim 14, wherein the controller is further configured to cause the apparatus to:

receive, while operating the apparatus according to the second mode of operation, a read command associated with transitioning the apparatus to operate according to the first mode of operation;

transmit, based at least in part on receiving the read command, the image of the apparatus; and operate the apparatus according to the first mode of operation in response to receiving the read command and based at least in part on transmitting the image of the apparatus, wherein receiving the write command is based at least in part on operating the apparatus according to the first mode of operation.

19. A non-transitory computer-readable medium storing code comprising instructions which, when executed by a processor of an electronic device, cause the electronic device to:

transmit capability information that indicates a capability of the electronic device to transition between modes of operation based at least in part on a read command;

receive, from a host system while operating the electronic device according to a first mode of operation associated with a first power consumption and based at least in part on the capability information, the read command that indicates the processor to transition the electronic device to operate according to a second mode of operation associated with a second power consumption lower than the first power consumption, wherein the read command comprises a request for an image of the electronic device;

transmit, to the host system based at least in part on receiving the read command, the image of the electronic device stored in volatile memory based at least in part on operating the electronic device according to the first mode of operation; and operate the electronic device according to the second mode of operation in response to receiving the read command and based at least in part on transmitting the image of the electronic device.

20. The non-transitory computer-readable medium of claim 19, wherein the instructions, when executed by the processor of the electronic device, further cause the electronic device to:

indicate, to the host system, a threshold size of the image of the electronic device transmitted to the host system in response to one or more read commands associated with transitioning the electronic device to operate according to the second mode of operation, wherein receiving the read command is based at least in part on indicating the threshold size.

21. The non-transitory computer-readable medium of claim 19, wherein the instructions, when executed by the processor of the electronic device, further cause the electronic device to:

receive, from the host system while operating the electronic device according to the second mode of operation, a write command associated with transitioning the electronic device to operate according to the first mode of operation, the write command comprising the image of the electronic device;

write, based at least in part on receiving the write command, the image of the electronic device to the volatile memory; and operate the electronic device according to the first mode of operation in response to receiving the write command and based at least in part on writing the image of the electronic device to the volatile memory.

22. The non-transitory computer-readable medium of claim 19, wherein the instructions, when executed by the processor of the electronic device, further cause the electronic device to:

store, in non-volatile memory based at least in part on receiving the read command, data indicating a mapping between the image of the electronic device and the volatile memory to enable the electronic device to write the image of the electronic device to the volatile memory after operating the electronic device according to the second mode of operation.

23. The non-transitory computer-readable medium of claim 19, wherein the instructions, when executed by the processor of the electronic device, further cause the electronic device to:

transmit, to the host system based at least in part on receiving the read command, signaling associated with the image of the electronic device indicating a mapping between the image of the electronic device and the volatile memory.

* * * * *